M. Nichols,
Seed Planter,
N° 1,830.    Patented Oct. 16, 1840.
2 Sheets—Sheet 1.
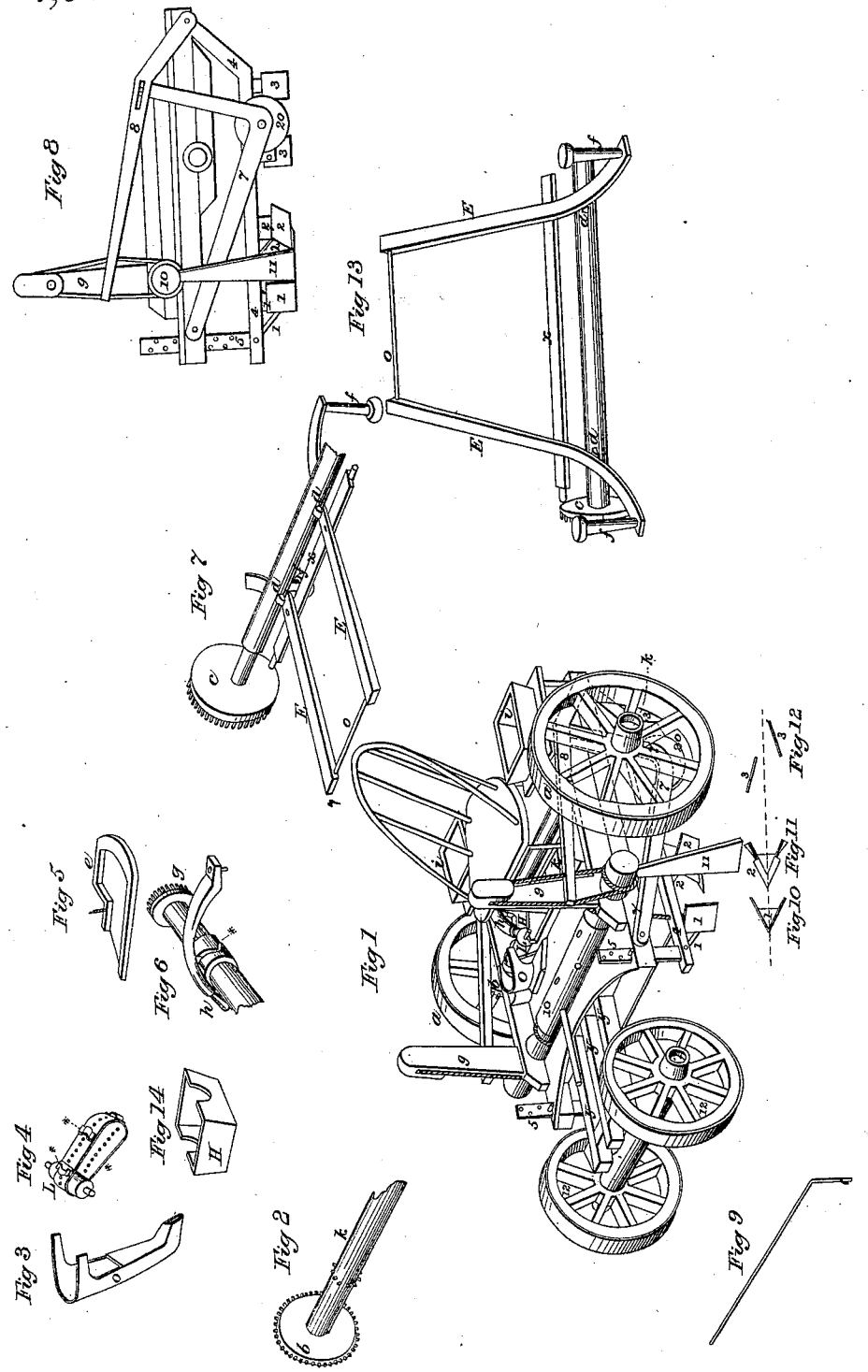

M. Nichols,
Seed Planter.
No. 1,830. Patented Oct. 16, 1840.
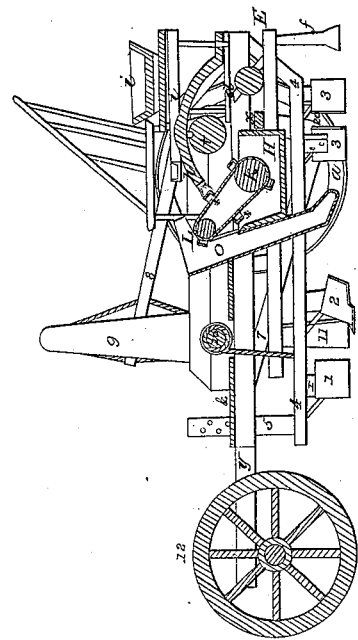
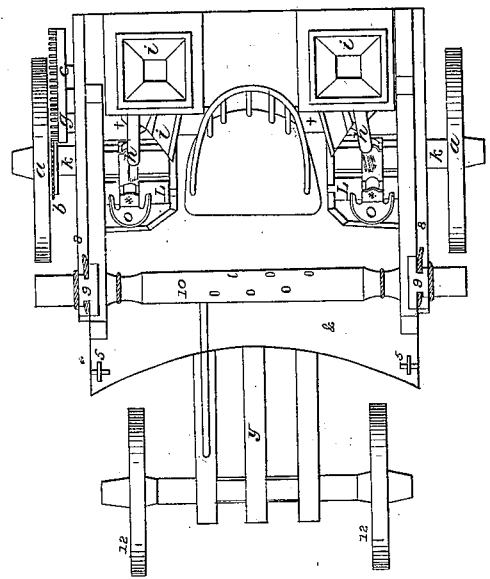

UNITED STATES PATENT OFFICE.

MARTIN NICHOLS, OF CLEARFIELD, PENNSYLVANIA.

IMPROVEMENT IN PLANTING-MACHINES.

Specification forming part of Letters Patent No. 1,830, dated October 16, 1840.

*To all whom it may concern:*

Be it known that I, MARTIN NICHOLS, of Clearfield, in the county of Clearfield and State of Pennsylvania, have invented a new and Improved Mode of Planting Corn; and I do hereby declare that the following is a full and exact description thereof, reference being had to the annexed drawings of the same, making part of this specification.

Figure 1 is a perspective view. Fig. 2 is a view of part of the main axle $k$ and the cog-wheel and cogs on the same; Fig. 3, the spout; Fig. 4, the elevating strap and buckets; Fig. 5, the shoe; Fig. 6, a zigzag groove and vibrating brush; Fig. 7, stamping-frame shaft and cogs to operate the same; Fig. 8, side view of a part of the machine next the wheel $a'$, which is removed for the purpose of showing it; Fig. 9, the marker for marking the rows; Fig. 10, the under side of plow No. 1; Fig. 11, the under side of plow No. 2; Fig. 12, the coverers; Fig. 13, the under side of the stamp; Fig. 15, a top view of the machine; Fig. 16, a vertical section.

The nature of my invention consists in leveling the ground by means of a grade or level before the plows and to plow two furrows—one to the right and the other to the left—with the same plow, drop the corn in hills with elevators, and cover the hills with covering-hoes, and stamp the hills down with one machine, drawn by two horses, the driver to sit on the machine, and carry two rows at the same time.

To enable others skilled in the art to make and use my invention, I will proceed to describe its construction and operation.

I construct my grade or level I with two wings, forming a sharp point at the fore end, and spread six inches behind. The wings are seven inches long and six inches high. This level or wings are bolted on a short piece of timber, 1, made fast in the plow-beam, (three inches before the plow,) with a rod running from the top of the grade up forward to the plow in the form of a brace to strengthen the grade. The intention of this grade I is to level the ground before the plow, and move the small stones, sticks, and small sods out of the intended furrow.

The form of the plow is as follows, without handles to guide it: The plow-beam 4 is nine inches below the bed of the machine and thirteen inches above the bottom of the plow, and when plowing it must lie level, except the hind part, which must crook up high enough to enter a mortise in the back end of the bed of the machine, so as to form a loose joint to admit of the fore end of the plow-beam falling and rising up to the bed. This joint plow-beam must be about four feet long and three inches square. This plow-beam carries the grade I in the fore end, and three inches behind the grade there is a small plow, 2. This plow has a sharp point, with two wings and two mold-boards, so as to turn two furrows—one to the right and the other to the left. This plow must be cast in one piece, the whole being about nine inches long. The mold-board must be six inches high, and spread six inches at the heel or back end. This cast plow is bolted on a short timber, and made fast in the plow-beam with a rod running from the plow up forward to the beam to strengthen the plow. This same plow-beam carries two covering-hoes, 3, in the hind part of the plow-beam—the one before the other three inches, and both spread from the center of the furrow—one to the right and the other to the left—three and a half inches at the fore end, one and three-fourths of an inch behind from the center, so as to turn both furrows in and cover the corn. These hoes must be six inches square, and bolted on a small piece of timber, and made fast in the back end of the plow-beam twelve inches behind the plow. The covering-hoes and plow must run three inches below the grade. This plow-beam 4 must have a sword, 5, made fast in the upper side of the plow-beam at the fore end. The sword must have a number of holes through it, and work through a mortise in the bed, so as to fasten the plow and grade higher or lower, (as the case may require,) with a bolt through the before-mentioned holes in the sword, as well as to confine the plow-beam to its place, and a rod running from one plow-beam to the other at the fore end to keep them at a proper distance. There must be an elbow, 7, which is made fast on the side at the fore end of the main bed with a bolt, so as to form a loose joint, with a cast-iron wheel, 20, in the elbow, one inch thick, cast solid, and ten inches broad. The back end of the elbow intersects a lever, 8, eighteen inches from the back end, with a loose joint. This elbow must be three feet long and three inches square. This lever 8 is made fast on the side of the back end of the bed with a bolt, so as to form a loose joint. This lever is three inches square, three and a half feet long. Eighteen inches from the back end there must be two long mortises—one for the purpose of the elbows playing back and forth in, as the elbow may be raised or lowered, the other mortise for the purpose of the pin slipping in that goes through the elbow. The operation of this elbow 7, wheel 20, and lever 8 is such that when the fore end of the lever is brought down it will raise up the hind end of the machine with all its implements from the ground for the purpose of driving from the house to the field, rising up where there are roots, and turning about at the end of the rows. There must be a windlass or roller, 10, placed across the fore part of the bed. This roller must be five inches through and long enough to be even with the outside of the hind wheels, with a number of holes in the middle to put a small hand-lever in to turn the roller with. At each end of this roller it has two shovels or levels, 11, fixed in each end of it, which move before the hind wheels for the purpose of leveling the lumps and plowed furrows into the hollows to make a level surface for the hind wheels, $a$, to run on. The operation of this roller 10 is as follows: This roller has four cords made fast at the two ends, two of them made fast to the fore end of the plow-beams for the purpose of raising the plows and grades from the ground. The other two cords are made fast to the fore end of the two levers 8 for the purpose of hauling the two levers down to raise the hind part of the machine up from the ground. These same last-mentioned cords go from the fore end of these levers 8 up over the pulleys in the upright post 9 for the purpose, when the other operation has ended, for this same roller 10 to raise the levers, let down the whole machinery, and raise up the elbow-wheels 20 from the ground; and with a small hand-lever in the middle of this roller 10, the man driving in his chair with one hand can easily raise from the ground the shovels, both plows, the grades, and the covering-hoes, with all the machinery, at one light pull at the hand-lever. The upright post marked 9 must be eighteen inches high, one and a-half inches thick, with a bunch on the outside of the top with a mortise in it for the pulley to run in. This post must be six inches wide at the bottom and three at the top. The traverse-wheel $a$ is one of the hind wheels of the machine, and is made fast to the axle-tree $k$. This axle-tree must be about four inches through, the length according to the width of the rows of corn; and near the end inside of the bed there must be cogs for the purpose of carrying the elevator-strap $x$ and cups which drop the seed. Half round this traverse-wheel is the distance from one hill to another, to plant four feet apart. This wheel must be thirty-one inches diameter, and so in proportion to the width of the rows. The cog-wheel $b$ must be made fast on the inside of the traverse-wheel $a$, and is sixteen inches diameter and has forty-eight cogs to mesh with other wheels. The stamping-frame E, which is made fast to a roller, $x$, under the hind end of the machine, and is made with two crooked timbers, about three inches square and three feet long. They must crook to the right and to the left eight inches for the purpose of bending around the elevator-box and spread at the back end, so wide as to come over both rows of corn, with a stamp, $f$, in the back end of these crooked timbers to stamp the hills when covered. This frame must have a rod, $o$, from one to the other at the fore end to stiffen it. This frame must be heavier before the roller than behind, for the purpose of raising the stamps up between the hills, and when the stamps are over the hills the cogs $d$ in the shaft of the stamping-wheel $c$ will force the stamps $f$ down on the hills. The stamping-wheel $c$ must be the same size, and have the same number of cogs that the cog-wheel $b$ has, to keep the stamping right on the hill. There must be a shaking-brush, or strike, $h$, to strike off the heaping corn on the elevator-cups$^x$, which the seed are measured with. This same shaking-brush shakes the shoe $i$, which conducts the corn from the hopper $i$ into the elevator-box H as far as is necessary. This shaking-brush $h$ is put on the end of a piece of timber as a handle for the brush, and made fast to the back end of the machine with a screw, and near the brush there is a half-inch pin in the brush-handle, which plays in an angling mortise, $t$, in the shaft of the shaking-wheel $g$, and shakes the brush across the top of the elevator-cups$^x$ to brush off the overplus corn. This shaking-wheel $g$ must be six inches in diameter, and have twelve cogs in it. The shafts $t$ of the shaking-wheel must have an angling mortise, $t'$, over the elevator-box for the purpose of the half-inch pin in the handle of the brush to play in. The hopper $i$ and the shoe $i'$ for the seed are similar to those of a grist-mill, and for the purpose of letting the seed down into the elevator-box H. When the elevators run, to prevent the elevators from being overloaded, the elevator-strap must have holes or mortises in it to run on the cogs in the axle-tree K. There must be four holes in the strap between each measure, and five measures in each strap. This strap lies on a grade of forty-five degrees from the axle-tree K to a roller, L, which lies over the edge of the elevator-box H, where the elevators pass over this roller L and turn bottom up and empty the seed into the tube $o$, which conducts the seed down to the hill in the furrow. This spout must be on the outside of the elevator-box, with a broad upper end, in order to receive the seed. The fore end of the bed $y$ runs out narrow from the inside of a circling floor, &, and extends forward three feet and eighteen inches wide, with a rocker placed under the fore end to rest on an axle-tree in the fore wheels, with a bolt through the rocker and axle-tree. These fore wheels, 12, must run two feet eight inches apart for the purpose of turning short within the circling floor. There must be a guide, ×, placed on the fore end of the bed, which guide may be an iron rod to extend over to the last-made rut, with a crook pointing down to the same for the purpose of giving the proper distance from one row to the other.

What I claim as my invention, and which I desire to secure by Letters Patent, is—

1. The manner in which I have arranged the plow-beam by combining it with the bed or frame of the machine by means of a bolt at one extremity of the beam and a sword-piece at the other working through a slot in the frame, so as to allow of the plow being raised or lowered, as set forth.

2. In combination with the above arrangement, the windlass 10, lever 8, and bent lever 7, having at its lower extremity a friction-wheel, 20, as herein shown, the windlass being connected with the plow-beam 4 and lever 8 by means of cords, which, when the lever is operated, raises the front of the plow-beam and necessarily the plows from the earth, and at the same time depresses the end of the lever 8, which forces down the bent lever 7 and the friction-wheel 20 it carries upon the ground, so as to allow of the machine resting upon it.

3. The combination of the stamping machine or frame, as herein constructed and operated, with the plows and their coverers, as arranged on each side of the machine, the stamps $f$ on the frame being placed in the rear of the coverers for the purpose of stamping the hills after the grain has been covered, as above described.

4. The manner in which I arrange and operate the brush or striker $h$ for clearing off the cups, as herein set forth.

MARTIN NICHOLS.

Witnesses:
WM. ALEXANDER,
EBENEZER MAGEE.